US010506870B2

(12) United States Patent
Cameron et al.

(10) Patent No.: US 10,506,870 B2
(45) Date of Patent: Dec. 17, 2019

(54) TABLE AND TABLE CONNECTOR SYSTEM

(71) Applicant: BCG DESIGN GROUP LIMITED, Hong Kong (CN)

(72) Inventors: Andrew David Cameron, Toorak (AU); Han Young Hwang, Eastwood (AU); Lee David Blattmann, Castle Cove (AU)

(73) Assignee: BCG DESIGN GROUP LIMITED, Hong Kong (CN)

( * ) Notice: Subject to any disclaimer, the term of this patent is extended or adjusted under 35 U.S.C. 154(b) by 0 days.

(21) Appl. No.: 16/079,911

(22) PCT Filed: Feb. 24, 2017

(86) PCT No.: PCT/IB2017/051055
§ 371 (c)(1),
(2) Date: Aug. 24, 2018

(87) PCT Pub. No.: WO2017/145098
PCT Pub. Date: Aug. 31, 2017

(65) Prior Publication Data
US 2019/0069668 A1 Mar. 7, 2019

(30) Foreign Application Priority Data

Feb. 26, 2016 (AU) ................. 2016900696

(51) Int. Cl.
*A47B 3/08* (2006.01)
*F16B 12/26* (2006.01)
(Continued)

(52) U.S. Cl.
CPC .............. *A47B 3/08* (2013.01); *A47B 87/002* (2013.01); *F16B 12/26* (2013.01); *F16B 12/38* (2013.01); *A47B 2087/004* (2013.01)

(58) Field of Classification Search
CPC ........ A47B 3/08; A47B 3/0809; A47B 3/0815; A47B 2003/0821; A47B 2003/0824; A47B 87/00; A47B 87/002; F16B 12/32
(Continued)

(56) References Cited

U.S. PATENT DOCUMENTS

| 1,860,644 A | 5/1932 | Bales et al. |
| 1,905,219 A | 4/1933 | Crichton |

(Continued)

FOREIGN PATENT DOCUMENTS

| DE | 29806143 U1 | 9/1998 |
| DE | 102005013007 A1 | 9/2006 |

(Continued)

OTHER PUBLICATIONS

PCT/IB2017/051055 received an International Search Report dated May 30, 2017, 7 pages.
(Continued)

*Primary Examiner* — Jose V Chen
(74) *Attorney, Agent, or Firm* — Kilpatrick Townsend & Stockton LLP

(57) ABSTRACT

A table top utilising an anchor affixed to the said table top and at least one leg to support the table top above a ground surface. The anchor is adapted to engage with the leg via a pivoting joint, such that the leg can pivot between an active position where leg is presented to engage with the ground to support the table top above the ground, and a stowed position wherein the leg is disposed to extend substantially adjacent (preferably parallel) to the lower surface of said table top. The leg is releasably retained in the stowed position by the interaction of a catch and receiver at a location distal from the pivoting joint.

10 Claims, 12 Drawing Sheets

(51) Int. Cl.
*F16B 12/38* (2006.01)
*A47B 87/00* (2006.01)

(58) Field of Classification Search
USPC .................. 108/129, 125, 131, 132, 133, 64
See application file for complete search history.

(56) References Cited

U.S. PATENT DOCUMENTS

| | | | | |
|---|---|---|---|---|
| 2,145,734 | A | | 1/1939 | Rastetter |
| 2,653,066 | A | * | 9/1953 | Anderson ............ A47B 3/0815 108/129 |
| 2,704,236 | A | * | 3/1955 | Mahr .................... A47B 3/0912 108/64 |
| 2,836,475 | A | * | 5/1958 | Sapp .................... A47B 87/002 108/64 |
| 2,851,311 | A | * | 9/1958 | Gibbs ...................... E04G 1/28 108/185 |
| 2,857,223 | A | * | 10/1958 | Furey .................... A47B 87/002 108/64 |
| 3,342,147 | A | * | 9/1967 | Shettles ............... A47B 87/002 108/185 |
| 3,396,928 | A | * | 8/1968 | Lay ....................... A47B 3/0815 108/129 |
| 3,554,141 | A | * | 1/1971 | Burr ..................... A47B 3/0815 108/132 |
| 4,144,822 | A | * | 3/1979 | Roberts ................ A47B 3/0815 108/125 |
| 4,158,335 | A | * | 6/1979 | Belcastro ............. A47B 87/002 108/64 |
| 4,502,807 | A | | 3/1985 | Salice |
| 4,573,415 | A | * | 3/1986 | Ramey ................. A47B 3/0815 108/129 |
| 4,752,150 | A | | 6/1988 | Salice |
| 5,182,996 | A | * | 2/1993 | Gutgsell .............. A47B 87/002 108/64 |
| 5,341,749 | A | * | 8/1994 | Noakes ................ A47B 87/002 108/156 |
| 5,438,937 | A | * | 8/1995 | Ball ..................... A47B 87/002 108/64 |
| 5,560,302 | A | * | 10/1996 | Diffrient .............. A47B 87/002 108/64 |
| 5,678,948 | A | * | 10/1997 | White ...................... A47B 1/00 108/64 |
| 5,794,545 | A | * | 8/1998 | McDaniel ............ A47B 87/002 108/64 |
| 5,947,628 | A | * | 9/1999 | Hansen ................ A47B 87/002 108/64 |
| 6,047,648 | A | * | 4/2000 | Alm ..................... A47B 13/021 108/157.16 |
| 6,386,119 | B1 | * | 5/2002 | Lin ...................... A47B 3/0815 108/129 |
| 6,394,005 | B1 | * | 5/2002 | Isensee ................ A47B 3/0815 108/132 |
| 7,322,299 | B2 | * | 1/2008 | Greene ............... B65D 19/0069 108/51.3 |
| 9,161,623 | B1 | * | 10/2015 | Lin ...................... A47B 87/002 |
| 2002/0046684 | A1 | | 4/2002 | Lin |
| 2010/0024690 | A1 | * | 2/2010 | Phillips ................ A47B 87/002 108/64 |
| 2013/0287484 | A1 | | 10/2013 | Phillips |

FOREIGN PATENT DOCUMENTS

DE 202006000109 U1 5/2007
WO 2017/145098 A1 8/2017

OTHER PUBLICATIONS

PCT/IB2017/051055 received a Written Opinion dated May 30, 2017, 12 pages.
EP 17755956.7 received a Supplementary European Search and Written Opinion dated Sep. 17, 2019, 7 pages.

* cited by examiner

TABLE AND TABLE CONNECTOR SYSTEM

The present invention relates to an improved table and an improved connector system for securing adjacent tables together, and to related assemblies and sub-assemblies therefor.

BACKGROUND

It may be necessary to set out adjacent tables in different configurations for different types of events. For example, for student examinations it may be desirable to arrange adjacent tables in an elongate row so that the exam candidates are all facing the front of the room and cannot easily read each other's test papers. For a buffet meal it may be desirable to arrange adjacent tables in parallel rows, or in a dog-leg shape, in order to maximise the number of people who can simultaneously access the food served on the tables. For a seminar or symposium it may be desirable to arrange adjacent tables in a horse-shoe shape so that all of the participants can face and verbally/visually engage with one another.

Where a number of adjacent tables are required in a particular configuration, it can be time and labour intensive to set out the tables as desired. Once the tables are set out, they may shift out of configuration as a result of being inadvertently bumped or moved during use.

It can be difficult to position and retain adjacent tables with their edges close enough that they can serve together as a continuous table top surface. If there are gaps between the edges of adjacent tables then items may fall through or become jammed in the gaps.

There can be discontinuities in height between the adjacent table tops, for example if one table has slightly longer legs, or if the tables are positioned on uneven ground. Such discontinuities can be inconvenient where a substantially flat surface is required, for example if the intention is to set drinking cups or glasses along the adjacent tables, or to create an artwork on a piece of paper spread across the adjacent tables.

And once the adjacent tables have served their purpose for a particular event or activity, it is often necessary to pack them away so that the space they occupy can be used for other events and activities. Again, this exercise can be time and labour intensive, and the tables can take up a considerable amount of storage space even when they are packed away.

It is known to provide tables with legs that fold up, so that the tables can be transported and/or stored more compactly when they are packed away. However such folding legs can be rickety and unstable when deployed to support the table. There may also be a risk of a user having his/her fingers and hands pinched or jammed while manipulating the folding legs to deploy them or fold them up.

It is therefore an object of the present invention to provide one or more of a table, a table top, a pivoting leg assembly, a connector system for engaging adjacent table tops, and a storage system for tables, which at least partially ameliorates one or more of the abovementioned disadvantages, or at least provides the public with a useful choice.

SUMMARY OF THE INVENTION

In a first aspect the present invention may be said to be a connecting system for releasably securing a first table top with a second table top, said system comprising at least one male member to be secured to a first table top and at least one receptacle to be associated with the second table top within which the male member can slide to a position securing the first and second table tops together, said male member carrying at least one deflectable barb, said barb being moveable between:
   a) a non-deflected condition, wherein sliding of the male member within the receptacle to separate the male member from the receptacle is inhibited by interference between the receptacle and the barb, and
   b) a deflected condition, wherein no interference exists between the receptacle and the barb, wherein said receptacle engages with said barb during movement of the male member into the receptacle to urge the barb toward the deflected condition, thus permitting sliding of the male member to the position securing the first and second table tops together at where the barb is permitted to return to the non-deflected condition to prevent withdrawal of the male member from the receptacle and wherein the receptacle is configured to permit access to the barb when the male member is in the position securing the first and second table tops so that the barb can be urged to the deflected condition by an external member to allow the male member to slide and allow its withdrawal from the receptacle.

In a second aspect the present invention may be said to connecting system for releasably securing a first table top with a second table top, said system comprising at least one male member secured or to be secured to a first table top and at least one receptacle associated with or to be associated with the second table top within which the male member can slide to a position securing the first and second table tops together, said receptacle comprising an inwardly projecting catch, said male member carrying at least one deflectable barb, said barb being moveable between:
   a) a non-deflected condition, wherein sliding of the male member within the receptacle to separate the male member from the receptacle is inhibited by interference between the catch and the barb, and
   b) a deflected condition, wherein no interference exists between the catch and the barb, wherein said catch engages with said barb during movement of the male member into the receptacle to urge the barb toward the deflected condition, thus permitting sliding of the male member to the position securing the first and second table tops together at where the barb is carried beyond the catch and permitted to return to the non-deflected condition to prevent withdrawal of the male member from the receptacle and wherein the receptacle is configured to permit access to the barb when the male member is in the position securing the first and second table tops, so that the barb can be urged to the deflected condition by an external member to allow the male member to slide and allow its withdrawal from the receptacle.

In some embodiments wherein a second receptacle is provide to be associated with the first table top and within which the male member can slide and be releasably secured to.

In some embodiments two of said receptacles are provided namely a first and second receptacles, the first receptacle to be associated with the first table top, and the second receptacle to be associated with the second table top, and wherein said male member is elongate and the male member can bridge between said first and second table tops, the male member carries two said barbs each for engagement with a respective one of said first and second receptacles so that when so engaged, the table tops are secured together.

In some embodiments the system comprises a plurality of said receptacles each associated with the second table top, each within which a said male member can slide to a position securing the first and second table tops together.

In some embodiments a plurality of receptacles are oriented such that the direction in which a male member can slide within a first of said receptacles is perpendicular to the direction in which a male member can slide within a second of said receptacles.

In some embodiments said first and second receptacles are identical.

In some embodiments the receptacle(s) is/are defined at least in part by an anchor which can be affixed to a respective table top.

In some embodiments the receptacle(s) is/are defined by the anchor.

In some embodiments the receptacle(s) is/are defined by the anchor in conjunction with a surface of the table to which the anchor is affixed.

In some embodiments the male member is integral to an anchor which can be affixed to said first table top.

In some embodiments the system is adapted to engage the first and second table tops in an edgewise fashion.

In some embodiments the system is adapted to engage the first and second table tops such that an edge of the first table top is contiguous with an edge of the second table top.

In some embodiments the system is adapted to engage the first and second table tops in a substantially co-planar relationship.

In some embodiments the system is configured so that sliding of the male member is in a linear direction that is normal to an edge of at least one of the table tops to be engaged.

In some embodiments the system is configured so that sliding of the male member is in a plane parallel to the plane of at least one of said first and second table tops.

In some embodiments the system is configured to bear a load of at least 80 kg acting normal to the direction of sliding when the male member has slid within the receptacle to a position securing the first and second table tops together.

In some embodiments the system is configured to bear a load of at least 100 kg acting normal to the direction of sliding when the male member has slid within the receptacle to a position securing the first and second table tops together.

In some embodiments the system is configured to bear a load of at least 150 kg acting normal to the direction of sliding when the male member has slid within the receptacle to a position securing the first and second table tops together.

In some embodiments the system is adapted to receive or engage with a leg to support the table top above a ground surface.

In some embodiments the connector is adapted to engage with the leg via a pivoting joint.

In some embodiments the pivoting joint is a knuckle joint.

In a further aspect the present invention may be said to A first table top adapted to removeably engage with at least a second table top via a connecting system herein described.

In a further aspect the present invention may be said to a table top comprising an anchor affixed to a lower major surface of said table top, and at least one leg to support the table top above a ground surface, wherein at least one of said anchor plates is adapted to engage with the leg via a pivoting joint, such that the leg can pivot between an active position where leg is presented to engage with the ground to support the table top above the ground, and a stowed position wherein the leg is disposed to extend substantially adjacent (preferably parallel) to the lower surface of said table top, wherein the leg is releasably retained in the stowed position by the interaction of a catch and receiver at a location distal from the pivoting joint.

In some embodiments the leg is disposed to extend substantially parallel to an edge of the table top in the stowed position.

In some embodiments one of the catch and receiver is secured at said lower major surface.

In some embodiments the leg comprises one of said catch and receiver.

In some embodiments one or other of said catch and said receiver is provided by a like anchor plate affixed to the lower major surface at a location distal the first mentioned anchor plate.

In some embodiments said catch is a projection and said receiver is a recess within which the projection can be received and retained.

In some embodiments said catch is a projection and said receiver is a recess within which the projection can be received and retained by an interference fit.

In some embodiments the table top is configured such that there is a sufficient gap between the lower surface of the table and the leg when retained in its stowed position that the stowed leg can be grasped and used as a handle.

In some embodiments the table top is a first table top or a second table top as herein described.

In some embodiments the table top is a first table top or a second table top as claimed in the system of claim 1 or 2

In some embodiments the catch engages with an angled face of the barb during movement of the male member into the receptacle to progressively urge the barb toward the deflected condition.

In some embodiments the catch presents an angled face to engage with the barb during movement of the male member into the receptacle to progressively urge the barb toward the deflected condition.

In a further aspect the present invention may be said to a pivoting leg assembly of or for a table top, comprising an anchor plate adapted to be affixed to a lower surface of said table top, and a leg to support the table top above a ground surface, wherein said anchor plate is adapted to engage with the leg via a pivoting joint, such that the leg can pivot between an active position where the leg is presented to engage with the ground to support the table top above the ground surface, and a stowed position wherein the leg is disposed to extend substantially adjacent (preferably parallel) the lower surface of said table top.

In some embodiments the pivoting joint is a knuckle joint.

In some embodiments the pivoting joint comprises first and second members joined by a common pivot pin (which defines the pivot axis), and wherein one of said first and second members acts to restrict access to the region about the pivot pin during pivoting of the leg.

In some embodiments the pivoting joint comprises first and second members joined by a common pivot pin (which defines the pivot axis), and wherein one of said first and second members acts to substantially encase the region about the pivot pin during pivoting of the leg.

In some embodiments the assembly further comprising a stop with which a complementary surface can selectively engage in order to lock the leg in its active position.

In some embodiments the assembly further comprises a biasing member to hold the stop and the complementary surface in engagement in order to lock the leg in its active position.

In some embodiments the bias of the biasing member acts radially outward from pivot axis of the pivoting joint.

In some embodiments the engagement of the stop and the complementary surface relies upon interference between a projection and a corresponding recess into which the projection can be received.

In some embodiments the projection is carried by the anchor plate, while the recess is defined by the leg.

In some embodiments the recess is defined by the anchor plate, while the projection is carried by the leg.

In some embodiments the pivoting joint comprises first and second members joined by a common pivot pin (which defines the pivot axis) wherein the first member comprises an elongate guide within which the pivot pin can slide between a first end of the guide and a second end of the guide, and a biasing member which exerts a bias drawing the pivot pin toward the first end of the guide, and wherein the second member comprises a camming surface at a fixed distance from the pivot pin, which camming surface engages as the leg is moved from its stowed position to its active position, to drive the pivot pin toward the second end of the guide, against the bias of the biasing member, and wherein the pivoting joint is configured to permit the pivot pin to be drawn back toward its first position under the bias of the biasing member when the leg is disposed in its active position, thus bringing the stop and complementary surface into engagement to the lock leg in its active position.

In some embodiments the camming surface rides over the stop to drive movement of the pin toward the second end of the guide as the leg is moved from its stowed position to its active position.

In some embodiments the pin is carried by the anchor plate.

In other embodiments the pin is carried by the leg.

In one aspect the invention can broadly be said to consist in a connecting system for removably engaging a first table top with a second table top as herein described with reference to the accompanying drawings.

In one aspect the invention can broadly be said to consist in a table top as herein described with reference to the accompanying drawings.

In one aspect the invention can broadly be said to consist in a pivoting leg assembly as herein described with reference to the accompanying drawings.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification [and claims] which include that term, the features, prefaced by that term in each statement, all need to be present but other features can also be present. Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.)

DESCRIPTION OF THE DRAWINGS

The invention will now be described by way of example only and with reference to the drawings in which.

DETAILED DESCRIPTION OF THE INVENTION

Figure 1:
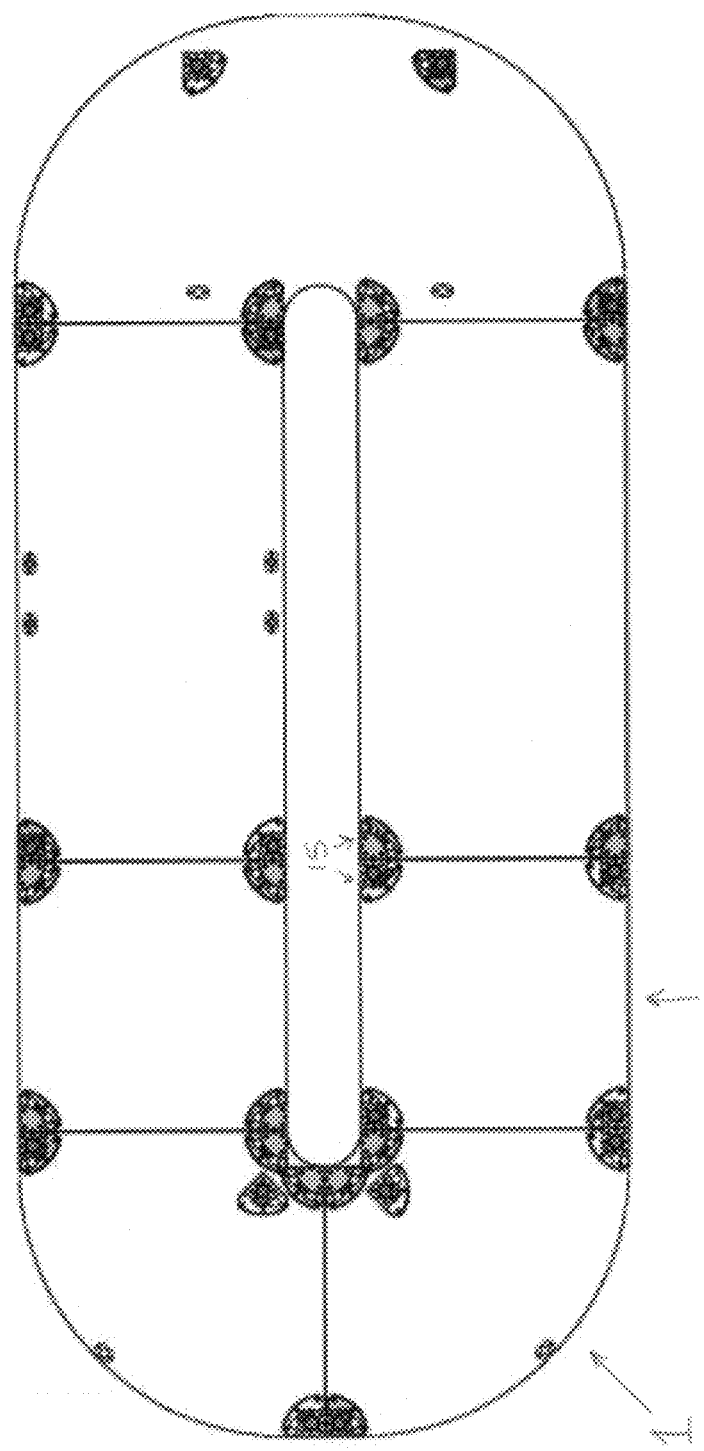
FIG. 1: shows adjacent table tops secured together in an oval configuration.

In some embodiments there is a connecting system for removably engaging at least a first and a second table top 1, 2. The connecting system allows adjacent table tops to be secured together for use as shown in FIG. 1. If the adjacent table tops are no longer required for use, then the connecting system permits the table tops to be disengaged and parted for subsequent transport and/or storage.

The connecting system comprises a male member 5 which is able to slidingly engage with a female receptacle 6. The male member 5 may be secured to the first table top 1, while the receptacle 6 may be associated with the second table top 2, so that the male member 5 can slide within the receptacle 6 to a position, shown in FIG. 3, at which the first and second table tops become secured together.

The male member 5 may carry a deflectable barb 7. The barb 7 may be moveable between a deflected condition, shown in FIG. 2, and a non-deflected condition, shown in FIG. 3.

In the deflected condition there is no interference between the barb 7 and the receptacle 6, thus permitting sliding of the male member 5 within the receptacle 6. The barb 7 may be moved or urged toward its deflected condition as the male member 5 slides into the receptacle 6.

Figure 2:
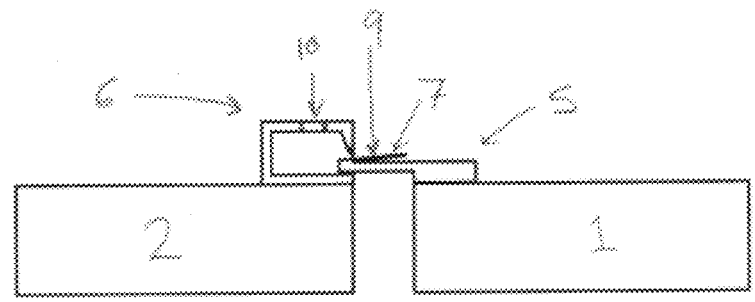
FIG. 2: shows a first embodiment of a connecting system for securing table tops together, wherein a barb of a male member (integral with an anchor) has been moved to its deflected condition as it slides into a receptacle.

For example, as shown in FIG. 2, there may be an inwardly projecting catch 8 of the receptacle 6 which engages with the barb 7 as the male member 5 slides into the receptacle 6 in order to deflect the barb 7. In some embodiments the barb 7 may present an angled face 9 to engage with the catch 8 during movement of the male member 5 into the receptacle 6 so that the barb 7 is progressively urged toward the deflected condition as the male member 5 slides further into the receptacle 6. A person skilled in the art will appreciate that a converse arrangement, where the angled face 9 is instead presented by the catch 8, will similarly cause a progressive deflection of the barb 7.

Once the male member 5 has slid some way into the receptacle 6, the barb 7 is permitted to return to its non-deflected condition. In the non-deflected condition there is interference between the barb 7 and receptacle 6 which inhibits sliding of the male member 5 to prevent it from being withdrawn from the receptacle 6. Thus the position of the male member 5 when the barb 7 is permitted to return to its non-deflected condition is the position at which the first table top 1 becomes secured to the second table top 2.

Figure 3:
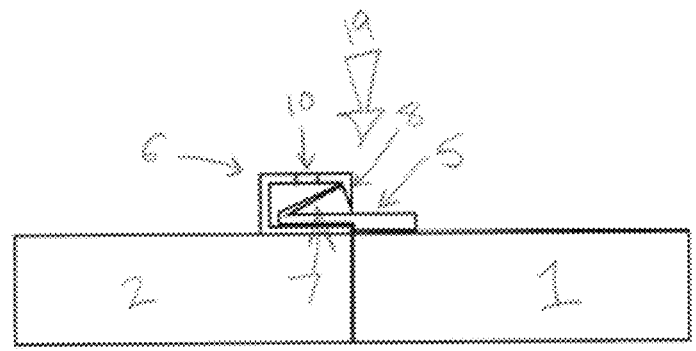
FIG. 3: shows the embodiment of FIG. 2, wherein the male member has slid to a position securing the tables together, and the barb has moved to it non-deflected condition.

For example, the male member 5 may slide to the position shown in FIG. 3, carrying the barb 7 beyond the catch 8. In this position the barb 7 returns to is non-deflected condition and can bear against the catch 8 to prevent withdrawal of the male member 5 from the receptacle 6.

In some embodiments the barb 7 has a degree of resilience, and can be deformed to its deflected condition with a subsequent resilient return to its non-deflected condition. However it will be appreciated that various other mechanical arrangements could alternatively be used to selectively move the barb 7 between its deflected and non-deflected conditions.

In some embodiments it is possible to access the barb 7 when the male member 5 is in the position shown in FIG. 3. This may be, for example, through the aperture 10 or some other cut-away portion of the receptacle 6. This permits access by an external member 11, such as the tool shown in FIG. 4, to move the barb 7 back to its deflected condition and release the table-to-table connection. The male member 5 can then be withdrawn from the receptacle 6, which may occur as the table tops 1, 2 are parted.

Figure 4:
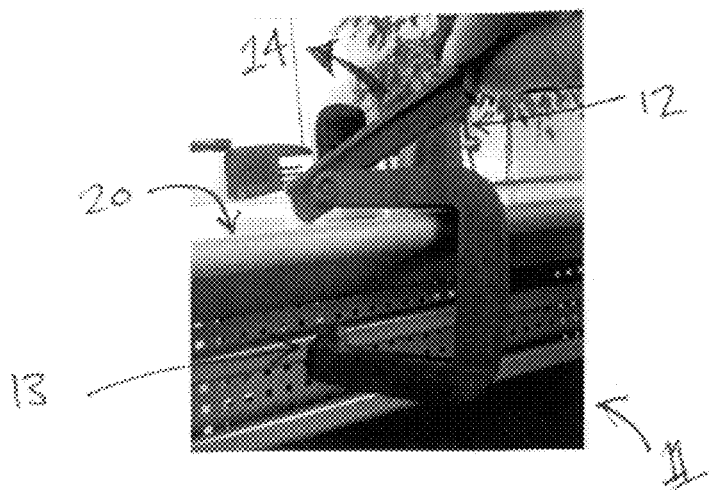
FIG. 4: shows a tool for accessing the barb to move it to its deflected condition to release the table-to-table engagement.

FIG. 4 shows an exemplary tool 11 for engaging with the barb 7 to release the connection, however the receptacle 6 could alternatively be configured to permit access to the barb 7 by some other type of external member 11, for example by permitting manual access to the barb 7. The tool 11 of FIG. 4 has a lever 12 and an engaging portion 13. The engaging portion 13 can access the barb 7 through the aperture 10. Bracing the lever 12 against the upper surface 20 of the table, and rotating the lever 12 about the pivot in the direction of the arrow shown as 14 in FIG. 4 causes corresponding rotation of the engaging portion 13 to depress the barb 7 to a deflected condition.

Figure 5:
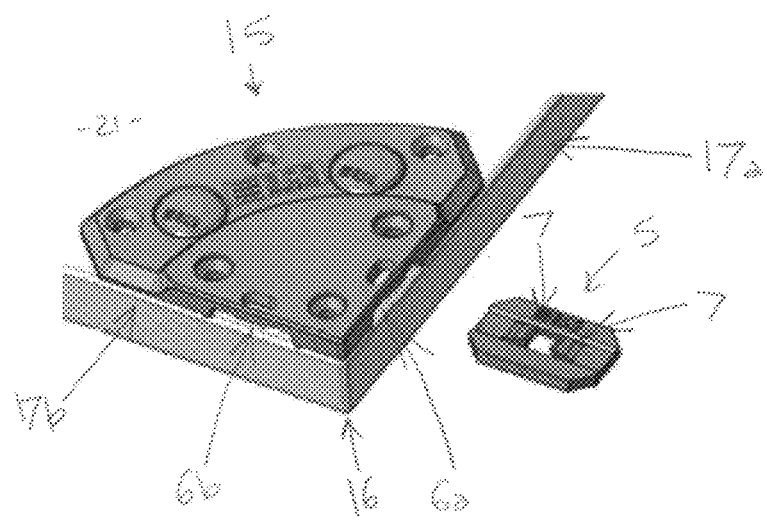
FIG. 5: shows a second embodiment of the connecting system where a male member can be secured to a first table top by a releasable engagement within a receptacle of an anchor.

In the embodiments shown in the Figures, the receptacle 6 is defined at least in part by an anchor 15 that is affixed to the second table top 2. In some embodiments the anchor 15 is affixed to a lower major surface 21 of the table top, but could alternatively be affixed to an upper major surface. It can be seen from the FIG. 5 that the receptacle 6 is defined in conjunction with the table surface, but alternatively the entirety of the receptacle 6 could be defined by and provided within the anchor 15.

Figure 6:
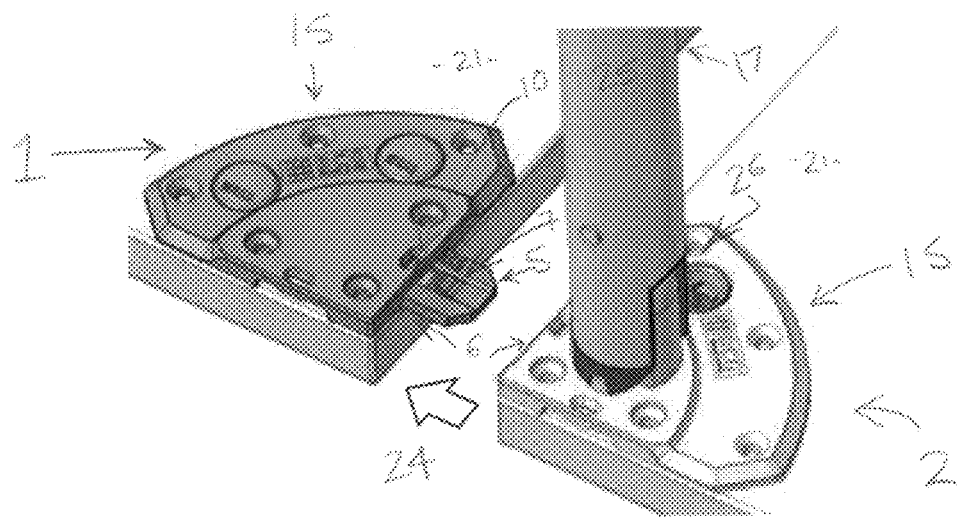
FIG. 6: shows the embodiment of FIG. 4, wherein the male member engages with a receptacle of an anchor associated with a second table top.

In the embodiment shown in FIG. 6 there is an anchor 15, at least partially defining a receptacle 6, affixed to each of the first and second table tops 1, 2. The male member 5 is provided by an elongate flat tab which has a barb 7 at each end (seen in FIG. 5), so that both ends of the male member 5 are able to slidingly engage with a respective one of the receptacles in the manner previously described.

In the embodiment shown in FIG. 6, in order to secure the first table top 1 to the second table top 2, the male member 5 may firstly be inserted into the receptacle 6 of the first table top 1 and slid until it reaches the position at where the barb 7 is permitted to return to its non-deflected condition. Thus the male member 5 is releasably secured to the first table top 1. The tables can then be secured together by presenting the male member 5 (now releasably secured to the first table top 1) to engage with the receptacle 6 associated with the second table top 2.

If the table-to-table engagement is released, and the table tops are parted, then it may be desirable to remove the male member 5 from the first table top 1 so that the table top can be transported and/or stored without the projecting male member 5. In this case the male member 5 can be released from the first table top 1 by accessing the barb 7 through aperture 10 and urging the barb 7 to its deformed condition so that the male member 5 can be removed from the receptacle 6. Although it will be appreciated that in alternative embodiments the male member 5 may instead be permanently secured to the first table top 1. For example, the male member 5 may be integral with an anchor 15 affixed to the first table top 1 as shown in FIGS. 2 and 3.

In some embodiments, an anchor 15 affixed to a table top may at least partially define two or more receptacles, each able to receive a said male member 5. For example, the anchor 15 shown in FIG. 5 partially defines two receptacles 6a, 6b which are offset from each other by 90 degrees. The anchor 15 is positioned at a vertex 16 of a table top. Thus it is possible to secure another table top alternatively adjacent a first edge 17a of the table top, or a second edge 17b of the table top, depending on the configuration required for the adjacent table tops. Furthermore, it would be possible to simultaneously secure table tops adjacent both of the first and second edges 17a, 17b, for example to achieve the configuration shown in FIG. 7.

In the example embodiments, the anchors 15 provide the receptacles 6 required for the connector system. The anchors 15 can be manufactured separately and retrofitted to existing table tops so that the table tops can be secured together by the connecting system as described. But it will be appreciated that the receptacles 6 could be defined in other ways. For example, a receptacle 6 could be provided as recess machined into the table top 1 itself.

Figure 8:
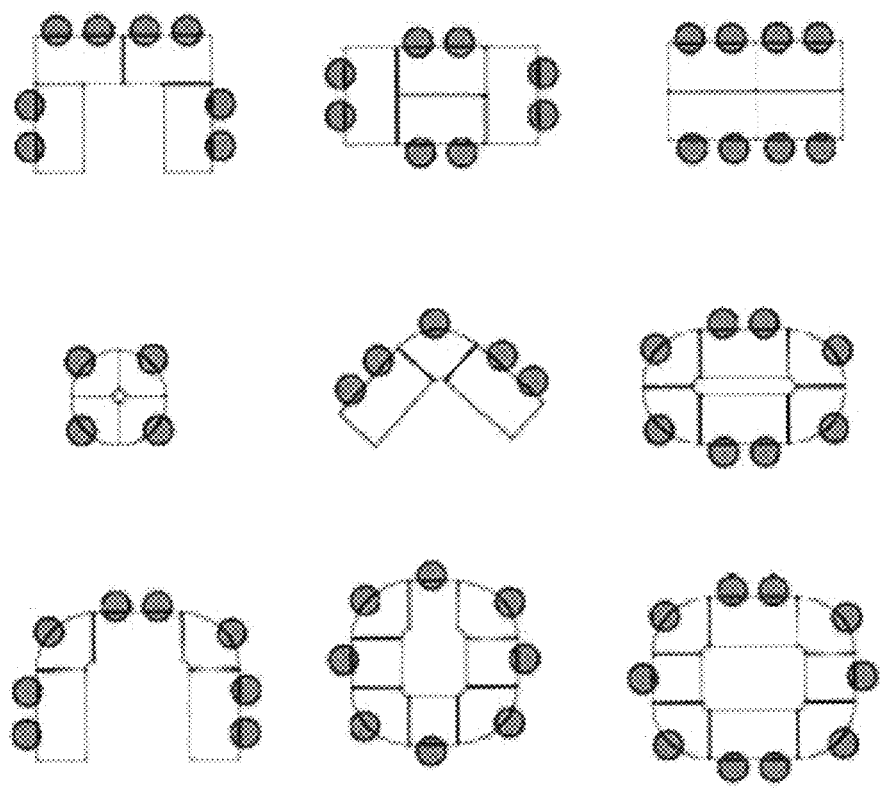
FIG. 8: shows various adjacent table configurations that can be achieved by securing table tops together with a connecting system.
Figure 9:
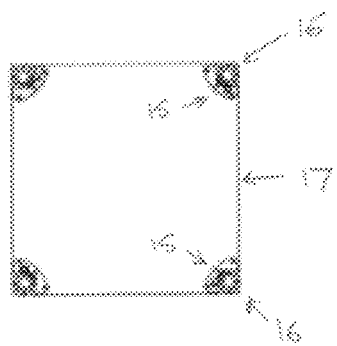
FIG. 9: shows a plan shape of a table top with anchors affixed at the vertices.
Figure 10:
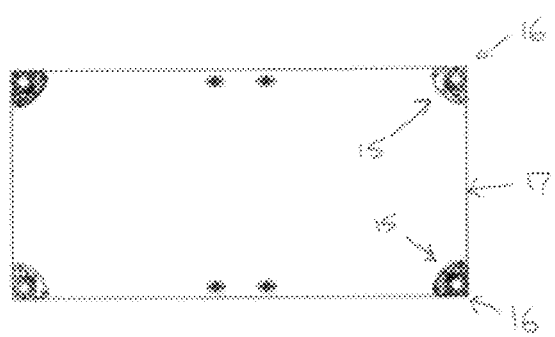
FIG. 10: shows an alternative plan shape of a table top with anchors affixed at the vertices.
Figure 11:
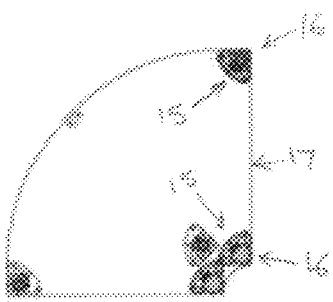
FIG. 11: shows a further alternative plan shape of a table top with anchors affixed at the vertices.
Figure 12:
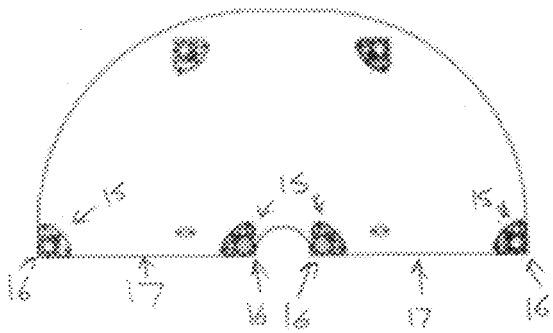
FIG. 12: shows a further alternative plan shape of a table top with anchors affixed at the vertices.

In any case, it is generally desirable that all of the receptacles 6 in the system are identical, and that the engaging portions of all the male members 5 in the system are identical, so that any male member 5 of the system can engage with any receptacle 6 of the system. In this embodiment, a variety of table tops having different plan shapes can be secured together in a modular fashion to achieve a range of different adjacent table top configurations. Some possible different configurations are shown in FIG. 8.

A variety of different table tops having different plan shapes are shown in FIGS. 9 to 12. It can be seen that it is generally advantageous to provide table tops which have a plurality of vertices 16 in plan shape and at least some straight side edges 17 of a common length, and to locate the receptacles 6 of the connecting system at the vertices 16 (for example by affixing anchors 15 defining at least two offset receptacles 6a, 6b at one or more of the vertices 16) so that a range of adjacent table top configurations can be achieved.

Figure 7:
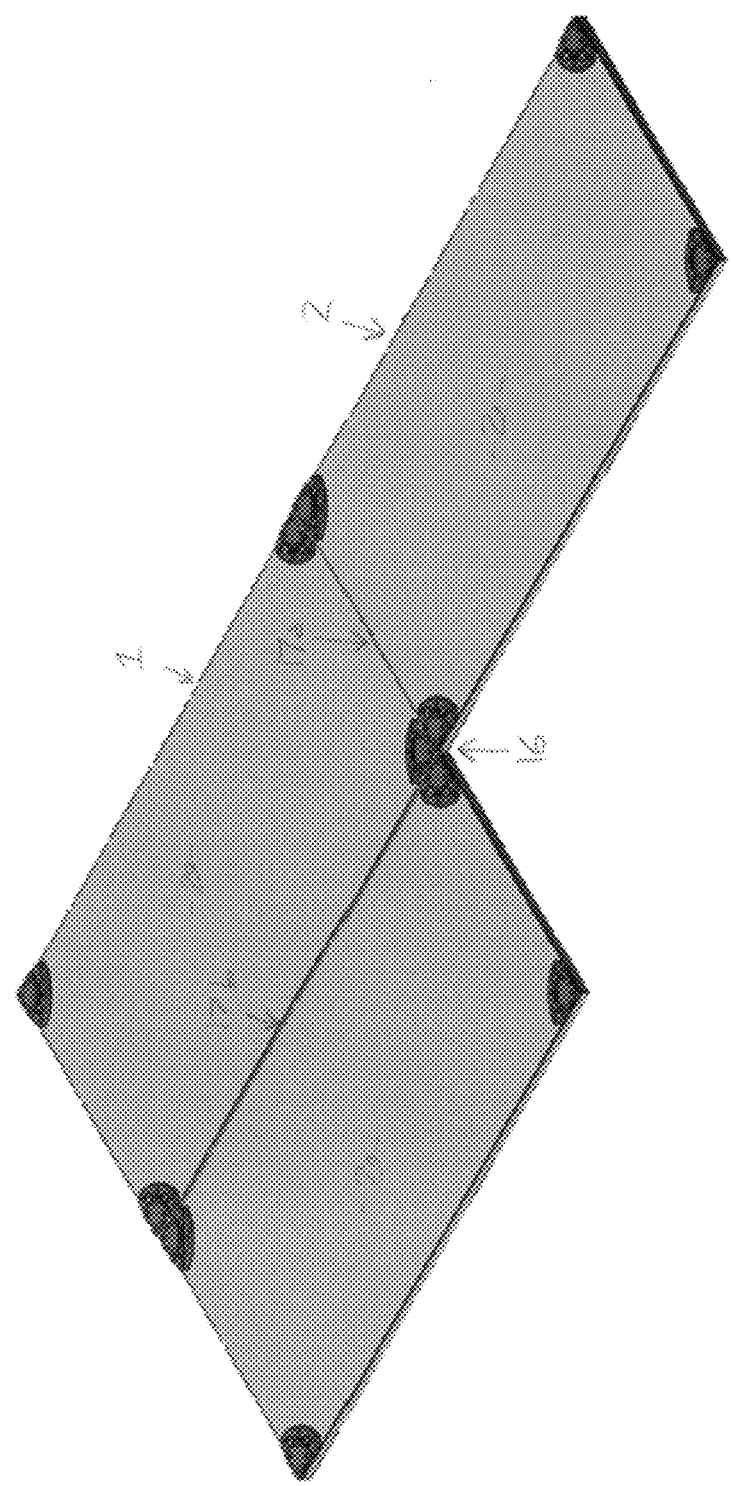
FIG. 7: shows adjacent table tops joined along their edges in a co-planar alignment.

When secured together, the connecting system may ensure that the edges 17 of adjacent table tops 1, 2 are held contiguous to one another, and/or that at least the upper major surfaces 20 of the adjacent table tops 1, 2 are held in substantially co-planar alignment, for example as shown in FIG. 7.

In some embodiments it is desirable that the table tops 1, 2 can be secured together by bringing the them into close proximity, and then sliding one table top 2 transversely toward the other 1 (in the direction 24 shown in FIG. 6) to engage the connector system. This means that it will not be necessary for a user to lift or support the weight of the table top 2 while effecting the connection. In order to achieve this, the connector system may be configured so that the male member 5 slides into the receptacle 6 in a linear direction normal to an edge 17 of at least one of the table tops to be joined, and substantially parallel to the plane of the table top.

In some embodiments the male member 5 may act as a bridge between two table tops 1, 2 which have been secured together, and may be able to bear a load acting normal to the direction of sliding of the male member 5, for example a shear load. In some embodiments the load may be at least 80 kg acting in a direction as shown by the arrow 19 in FIG. 3. In some embodiments the load may be at least 100 kg, or at least 150 kg.

In some embodiments an anchor 15, which at least partially defines a receptacle 6 of the connector system, may also be adapted to receive or engage with a leg 25. For example, the anchor 15 plate shown in FIG. 6 is adapted to engage with a leg 25 via a pivoting joint 26. The leg 25 may serve to support the table top above a ground surface alone or in co-operation with other legs of the table top. In such embodiments the anchor 15 may be affixed to a lower major surface 21 of the table top.

Figure 13:
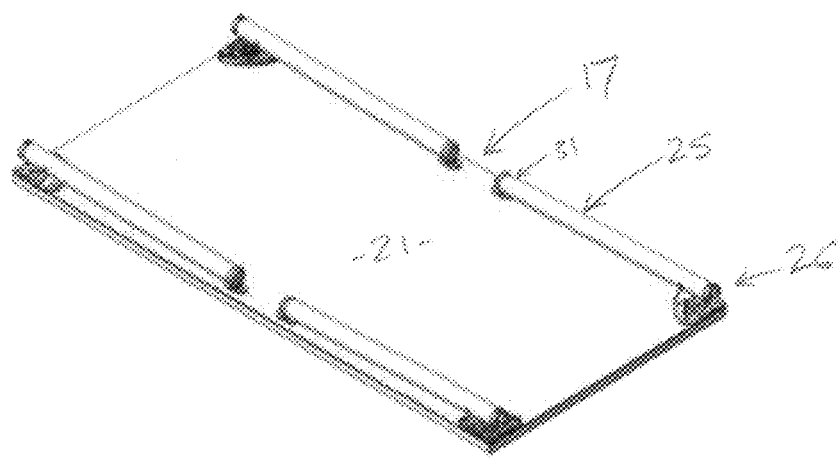
FIG. 13: shows a table with its legs disposed in a stowed position.
Figure 14:
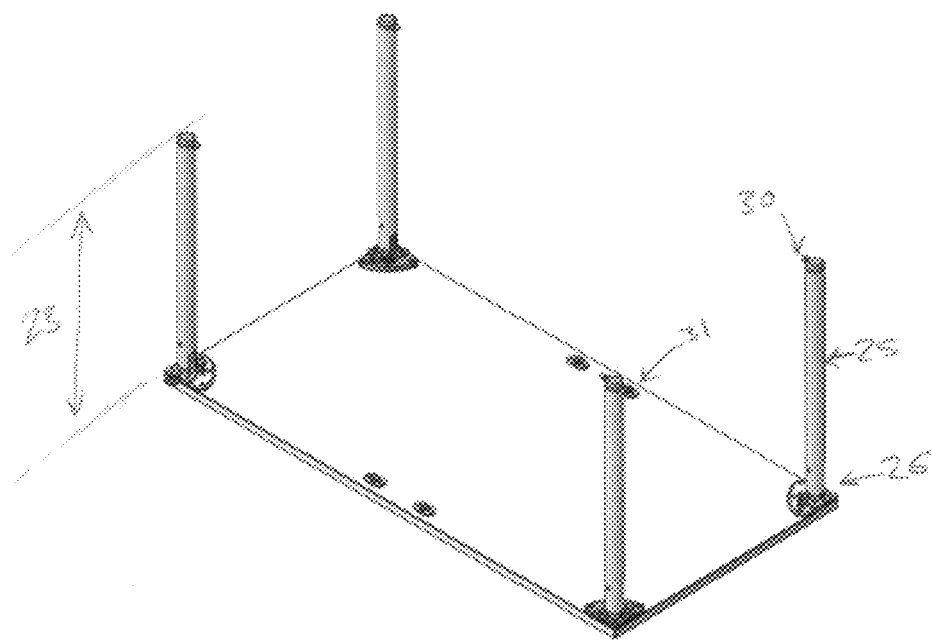
FIG. 14: shows the table of FIG. 13 with its legs disposed in an active position.

As previously discussed, there can be some utility in being able to fold up the legs of the table top when the table top is not desired for use. In some embodiments a pivoting leg 25 assembly can permit a leg 25 of the table top to pivot between a stowed condition, shown in FIG. 13, and an active position where the leg 25 is presented to engage with the ground 22 so as to support the table top some distance 23 above the ground surface 22, as shown in FIG. 14.

In the stowed position, the leg 25 may be disposed to extend substantially adjacent (and preferably parallel to) the lower surface 21 of the table top. In some embodiments the leg 25 may also be disposed to extend substantially parallel with an edge 17 of the table top, for example as shown in FIG. 13.

Figure 15:
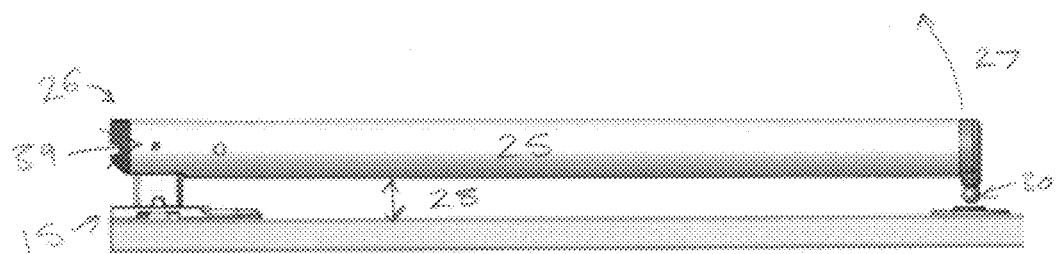
FIG. 15: shows a leg in its stowed position from side on, FIG. 16: shows a catch and receiver interaction to retain the leg in its stowed position.

In some embodiments there is a means to retain the leg 25 in its stowed position. For example this may be a catch 30 and receiver 31 located at some point distal from the pivoting joint 26, which can engage to resist force in the circumferential direction about the pivot axis 39 (shown by arrow 27 of FIGS. 15 and 16), thus restraining the leg 25 from pivoting toward its active position.

Figure 16:
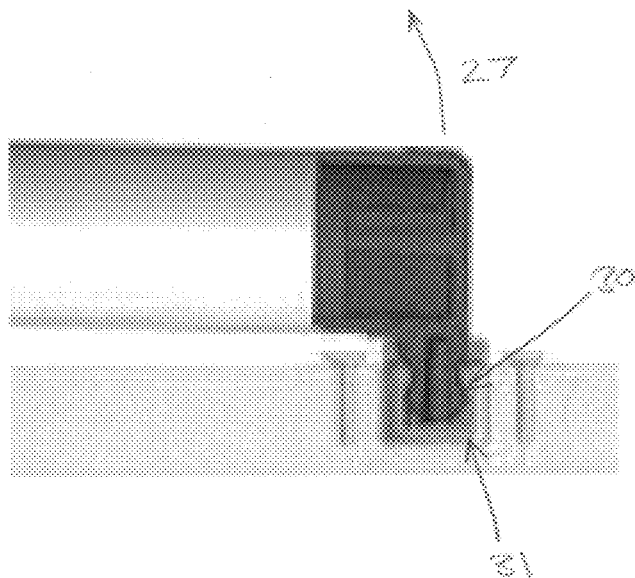

An exemplary catch 30 and receiver 31, which engage by way of an interference fit, is shown in FIG. 16. But it will be appreciated that other forms of releasable mechanical engagement could alternatively be employed, for example a hook and loop. In the embodiment shown in the drawings the catch 30 is a projection from the leg 25 to be stowed, while the receiver 31 is recessed into the lower surface of the table top. But it will be appreciated that a converse arrangement could alternatively be employed, where the catch 30 is carried by the table top and the receiver 31 carried by the leg 25 to be stowed.

Figure 17:
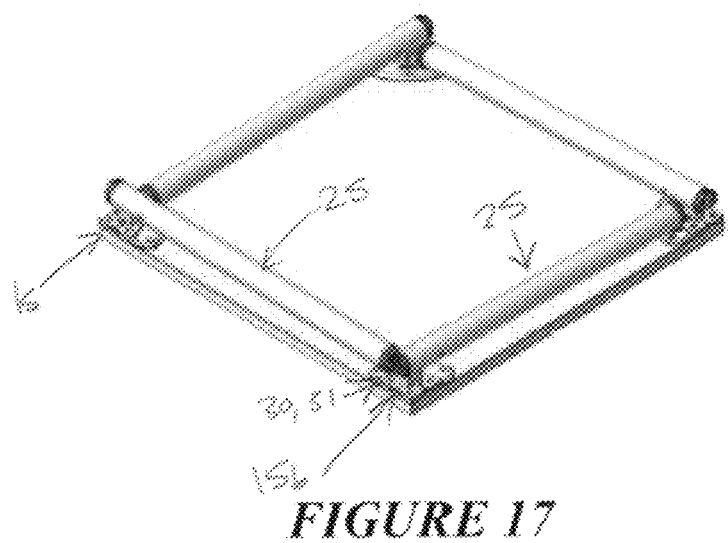
FIG. 17: shows an alternative table with its legs disposed in a stowed position.
Figure 18:
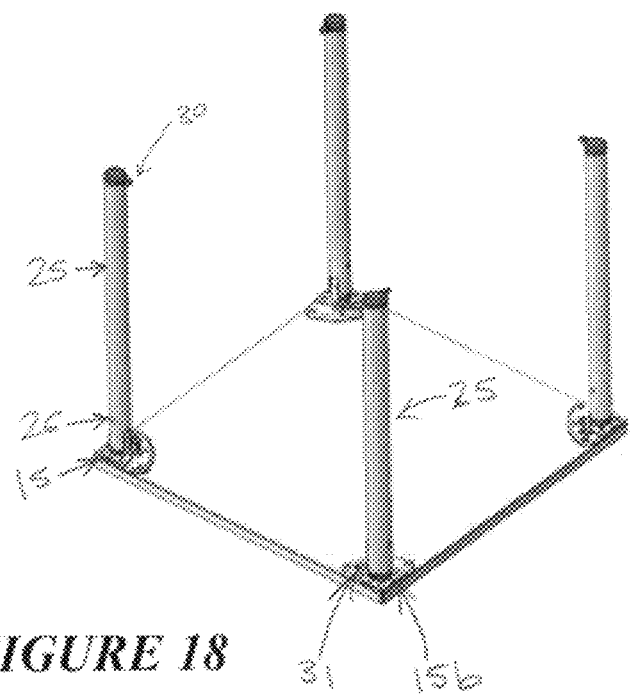
FIG. 18: shows the table of FIG. 17 with its legs disposed in an active position.

In some embodiments one or other of the catch 30 and receiver 31 may be carried or defined by an anchor 15b affixed to a surface of the table top at a point distal from the pivoting joint 26. This is shown in FIGS. 17 and 18. As also shown in FIGS. 17 and 18, the anchor 15b affixed at a point distal from the pivoting joint 26 may itself have a leg 25 depending from it.

In some embodiments the table top is configured such that there is a sufficient gap (shown as distance 28 in FIG. 15) between the lower surface of the table and the leg 25 when retained in its stowed position that the stowed leg 25 can be grasped and used as a handle. In some embodiments such a gap may exist (preferably substantially constantly) along at least a majority of the extent of the stowed leg 25.

In some embodiments the pivoting joint 26 has a means to lock the leg 25 in its active position. In some embodiments the lock may rely upon the engagement of a stop 36 and a complementary surface 37 which are brought into engagement when the leg 25 reaches its active position (having pivoted to the active position from the stowed position). There may also be a biasing member 38 which is biased to hold the stop 36 and complementary surface 37 in their locking engagement.

An example of how a stop 36 and complementary surface 37 may engage to lock the leg 25 in its active position, by restraining its rotation about the pivoting joint 26, is shown in FIGS. 19 to 23. In this example the first member of the pivoting joint 26 is the anchor 15 plate, and which is joined to the second member of the joint (the leg 25) by a pivot pin 35.

Figure 19:
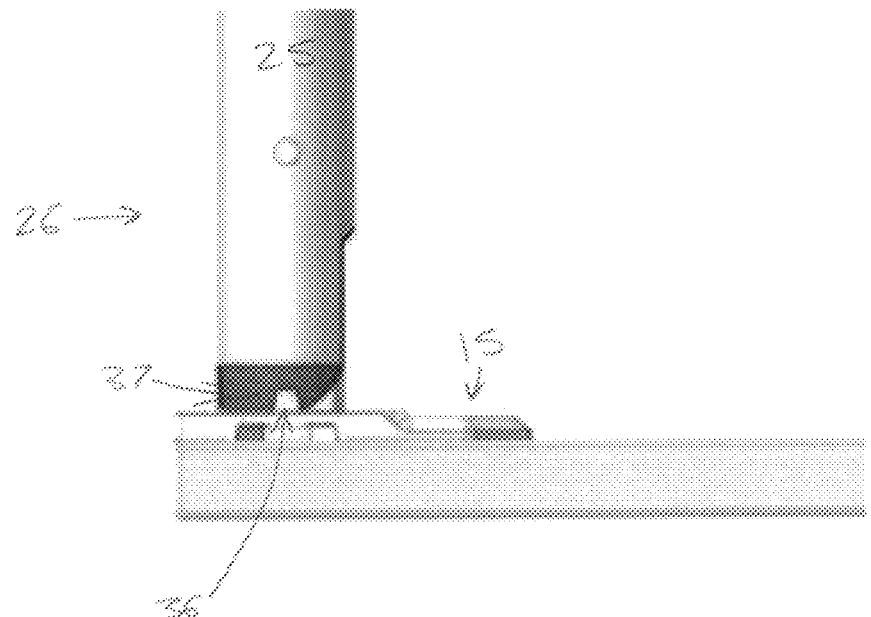
FIG. 19: shows a side view of a leg locked in its active position.
Figure 20:
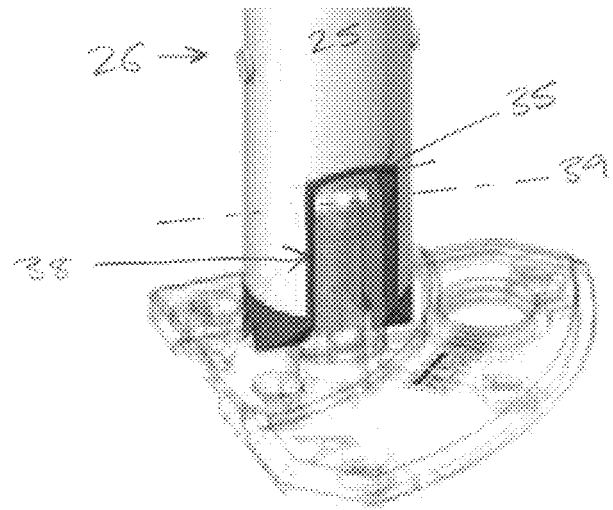
FIG. 20: shows detail of the pivoting joint when the leg is locked in its active position.
Figure 21:
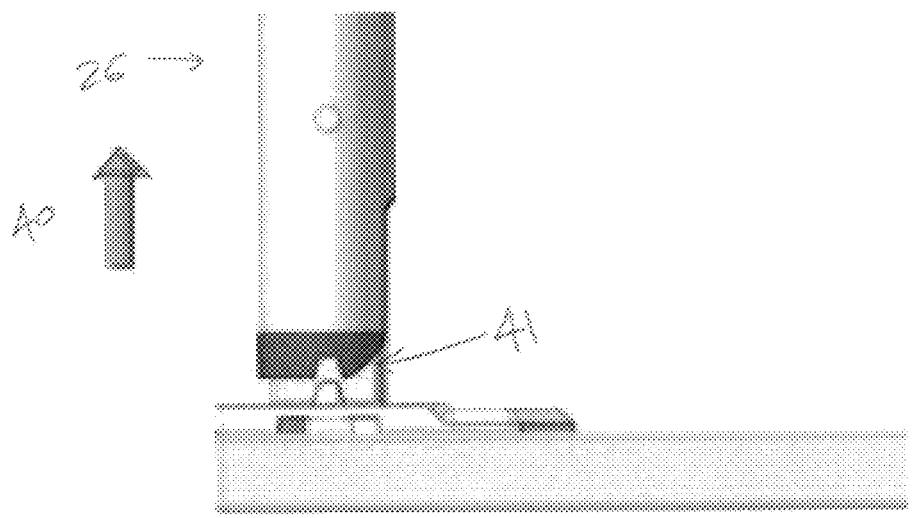
FIG. 21: shows the leg being pulled away to release the engagement between a stop and complementary surface which hold it locked in its active position.

The stop 36 is a projection of the anchor 15 plate, while the complementary surface 37 is a recess of the leg 25. The projection 36 and recess 37 are brought into locking engagement, as shown in FIGS. 19 and 20, when the leg 25 is rotated to its active position. A spring 38 exerts a biasing force on the pivot pin 35, acting in a direction radially outward from the pivot axis 39. The bias of the spring 38 holds the projection 36 and recess 37 in their locking engagement.

When it is desired to unlock the leg 25 from its active position, the leg 25 can be pulled away from the stop 36 against the biasing force (in the direction shown as 40 in FIG. 21) to disengage from the recess 37 so that the leg 25 is free to pivot back toward the stowed position.

Figure 22:
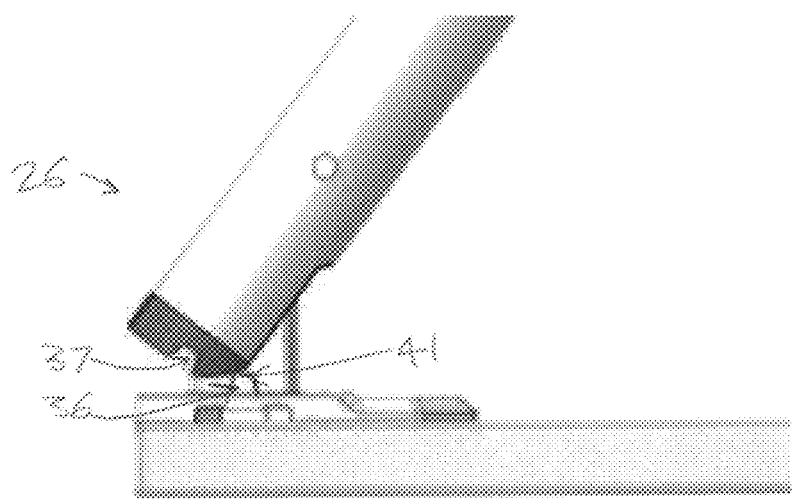
FIG. 22: shows a camming surface of the leg riding over the stop as the leg is rotated to its active position.
Figure 23:
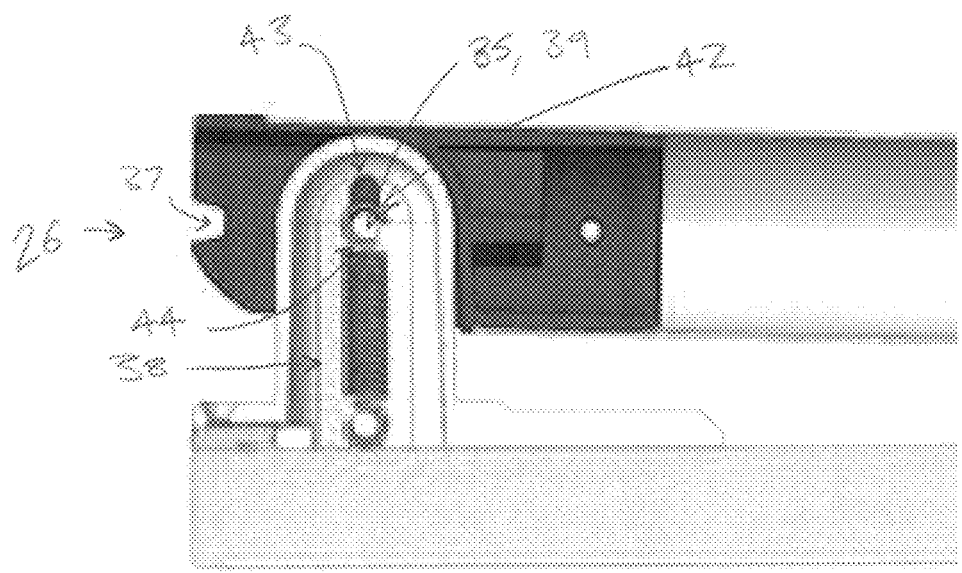
FIG. 23: shows cross sectional detail of the pivoting joint.

In this example, there is a camming surface 41 of the leg 25 which engages during pivoting of the leg 25 from the stowed condition to the active condition to assist a user in overcoming the biasing force of the spring 38 until the leg 25 has reached its active position. The camming surface 41 may ride over the stop 36 as the leg 25 is pivoting, as shown in FIG. 22, to drive the pivot pin 35, against the bias of the spring 38, along an elongate guide 42 provided by the anchor 15. The pivot pin 35 is driven toward a second end 43 of the guide 42 to give the leg 25 room to rotate. When the leg 25 has rotated to the active position, the pivot pin 35 is pulled back to the first end 44 of the guide 42, as shown in FIGS. 19 and 20. This draws the complementary surface 37 of the leg 25 into engagement with the stop 36.

It will be appreciated that a converse arrangement, where the stop 36 is carried by the leg 25, and the complementary surface 37 is provided by the anchor 15 plate could alternatively be employed. Similarly, the leg 25 may alternatively act as the first member of the joint providing the guide 42, while the anchor 15 may alternatively act as the second member of the joint providing the camming surface 41.

Figure 24:
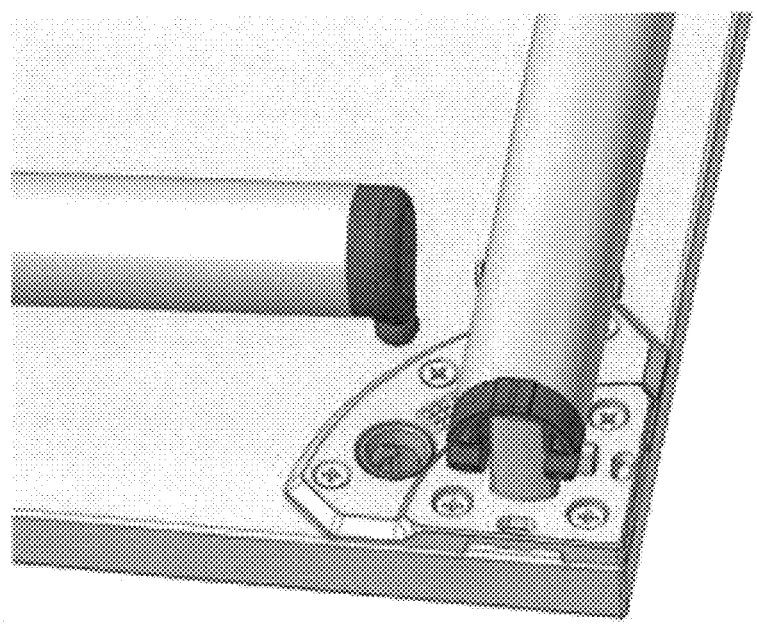
FIG. 24: shows a leg acting as a sleeve to encase about the region of the pivot pin during pivoting.

As shown in FIG. 24, the pivoting joint 26 may be a knuckle joint where the leg 25 acts as an exterior sleeve to substantially encase the region about the pivot pin 35 during pivoting of the leg 25. By restricting access to the region about the pivot pin 35, this reduces the likelihood of a user being pinched by the relatively moving parts of the joint as the leg 25 pivots between its stowed and active conditions.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

The invention claimed is:

1. A connecting system for releasably securing a first table top with a second table top, said system comprising at least one male member to be secured to the first table top and the second table top, and two receptacles to be associated with the first table top and second table top within which the male member can slide to a position securing the first and second table tops together,
    said male member carrying at least one deflectable barb, said barb being moveable between:
    a) a non-deflected condition, wherein sliding of the male member within the receptacle to separate the male member from the receptacle is inhibited by interference between the receptacle and the barb, and
    b) a deflected condition, wherein no interference exists between the receptacle and the barb,
    wherein the receptacle engages with said barb during movement of the male member into the receptacle to urge the barb toward the deflected condition, thus permitting sliding of the male member to the position securing the first and second table tops together at where the barb is permitted to return to the non-deflected condition to prevent withdrawal of the male member from the receptacle
    and wherein the receptacles are configured to permit access to the barb when the male member is in the position securing the first table top and second table top so that the barb can be urged to the deflected condition by an external member to allow the male member to slide and allow its withdrawal from either or both receptacles,
    wherein the two receptacles are a first receptacle and second receptacle, the first receptacle to be associated with the first table top, and the second receptacle to be associated with the second table top, and wherein said male member is elongate and the male member can bridge between said first and second table tops, the male member carries two said barbs each for engagement with a respective one of said first and second receptacles so that when so engaged thereto, the table tops are secured together.

2. A system as claimed in claim 1 further comprising a plurality of said receptacles each associated with the second table top, each within which a said male member can slide to a position securing the first and second table tops together.

3. A system as claimed in claim 2 wherein the plurality of receptacles associated with the second table top are oriented such that the direction in which a male member can slide within a first of said receptacles is perpendicular to the direction in which a male member can slide within a second of said receptacles.

4. A system as claimed in claim 1 wherein said first and second receptacles are identical.

5. A system as claimed in claim 1 wherein the receptacle (s) is/are defined by an anchor in conjunction with a surface of the table to which the anchor is affixed.

6. A table top as claimed in claim 5, comprising at least two like anchors affixed to a lower major surface of said table top, and at least one leg to support the table top above a ground surface,
    wherein the anchors are adapted to engage with the legs via a pivoting joint, such that the legs can pivot between an active position where the leg is presented to engage with the ground to support the table top above the ground, and a stowed position wherein the legs are disposed to extend substantially adjacent to the lower surface of said table top,
    wherein at least one of the legs is releasably retained in the stowed position by the interaction of a projection and recess at a location distal from the pivoting joint, wherein the leg comprises one of the projection and recess and wherein one or the other of the projection and recess is provided by the other anchor affixed to the lower major surface at a location distal the first mentioned anchor.

7. A table top as claimed in claim 6 wherein the leg is disposed to extend substantially parallel to an edge of the table top in the stowed position.

8. A table top as claimed in claim 6 wherein the table top is configured such that there is a sufficient gap between the lower surface of the table and the leg.

9. A table top as claimed in claim 6 wherein the table top is a first table top or a second table top.

10. A system as claimed in claim 1 wherein the male member is integral to an anchor which can be affixed to said first table top.

\* \* \* \* \*